Aug. 22, 1961  A. W. GARDINER  2,996,881
JET THRUST REVERSING AND AFTERBURNER MEANS
Filed Nov. 9, 1956  5 Sheets-Sheet 1
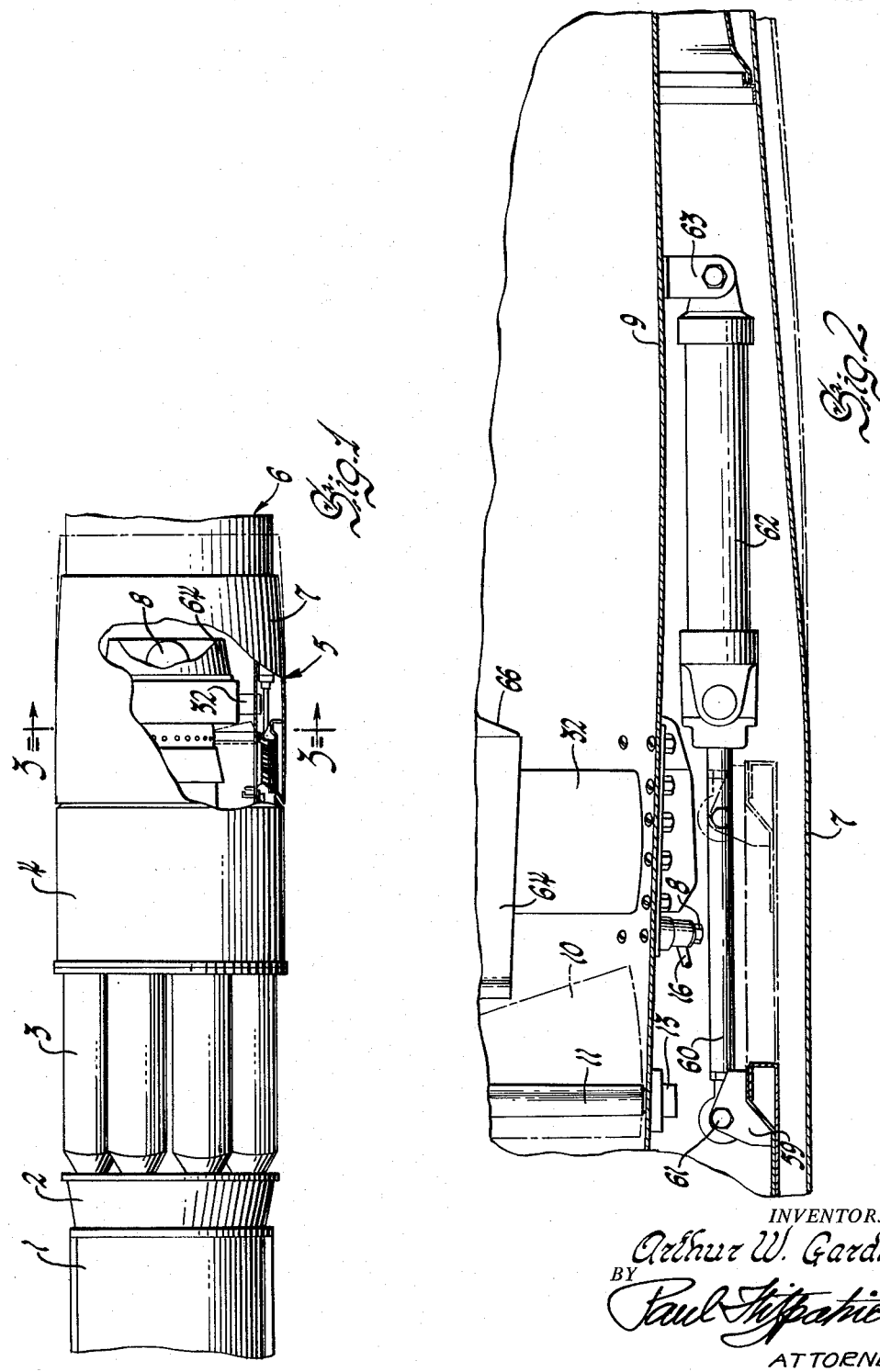
INVENTOR.
Arthur W. Gardiner
BY
Paul Fitzpatrick
ATTORNEY Aug. 22, 1961     A. W. GARDINER     2,996,881
JET THRUST REVERSING AND AFTERBURNER MEANS
Filed Nov. 9, 1956     5 Sheets-Sheet 2

INVENTOR.
Arthur W. Gardiner
BY Paul Fitzpatrick
ATTORNEY

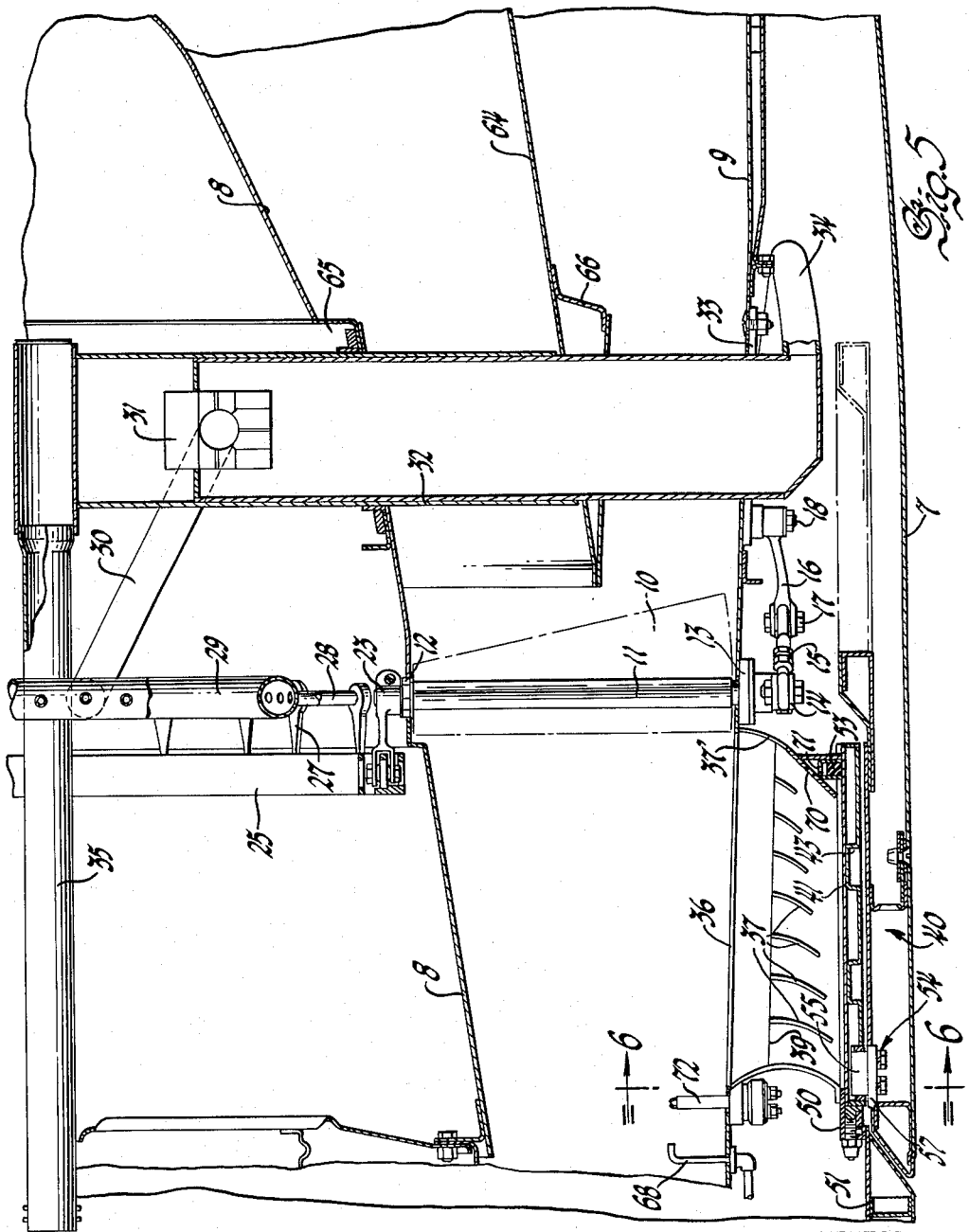

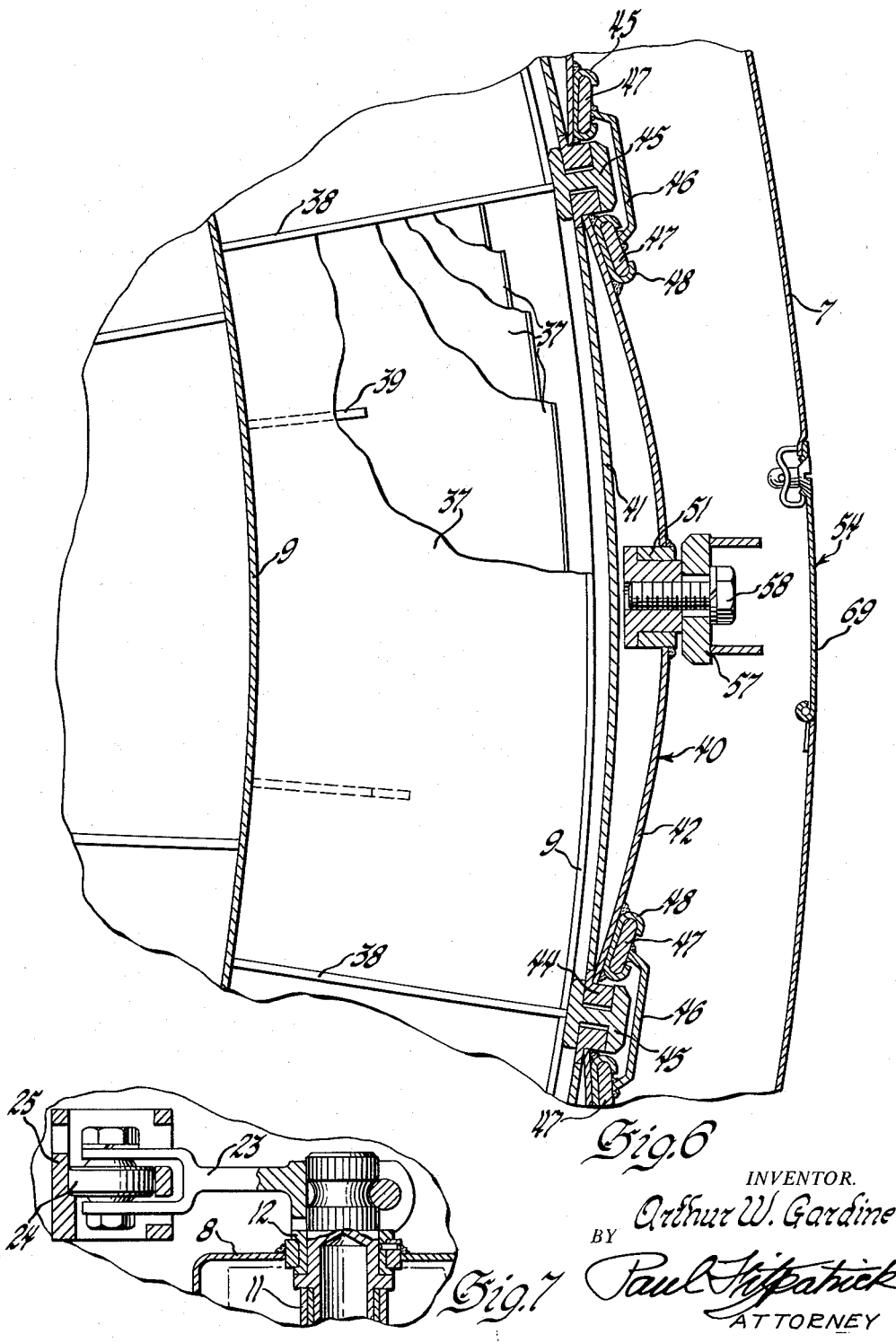

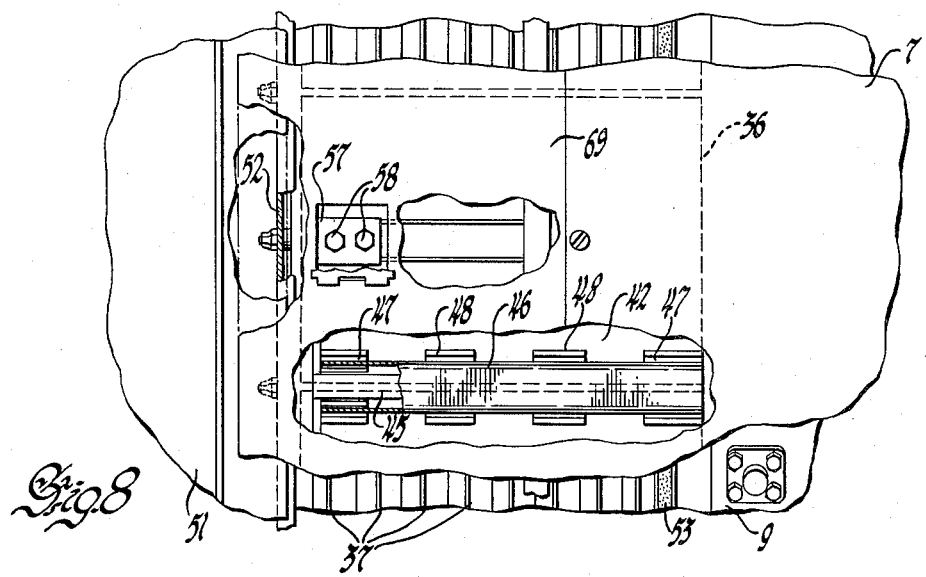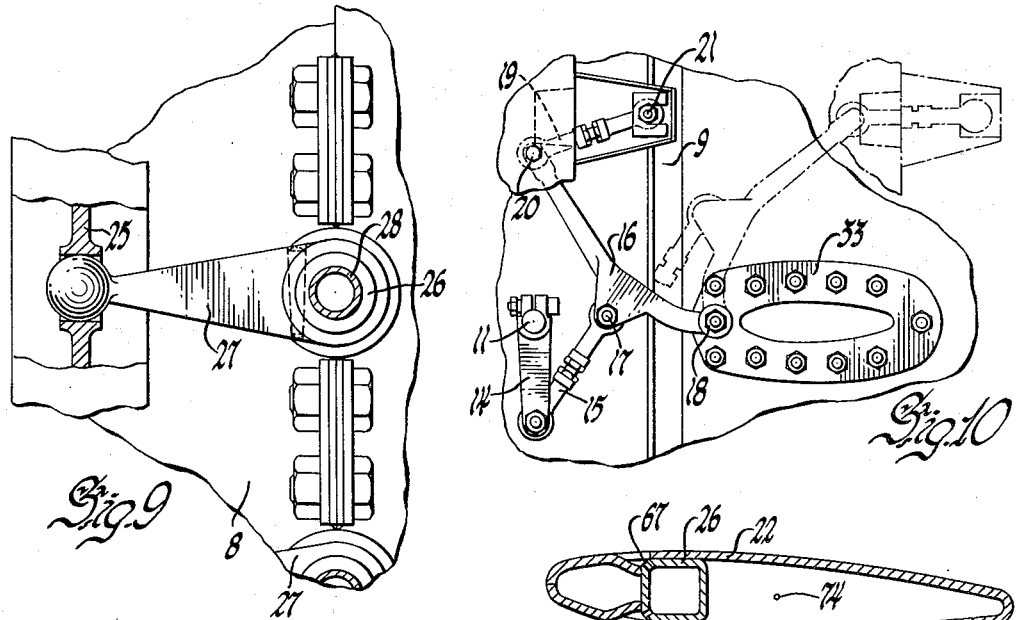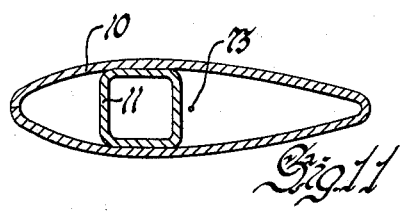

United States Patent Office 2,996,881
Patented Aug. 22, 1961

2,996,881
JET THRUST REVERSING AND AFTERBURNER MEANS
Arthur W. Gardiner, Indianapolis, Ind., assignor to General Motors Corporation, Detroit, Mich., a corporation of Delaware
Filed Nov. 9, 1956, Ser. No. 621,420
2 Claims. (Cl. 60—35.54)

This invention relates to jet thrust reversing means for jet engines in combination with afterburner means for such engines. The thrust reversing means provides a braking effect on the aircraft on which the engine is installed and the afterburner means provides added thrust to increase the speed of the aircraft in which the engine is installed.

Because of the ever increasing speed of operation of turbojet aircraft it has become more and more important to consider means for braking the speed of the aircraft for landing and maneuvering. Various means of accomplishing this braking have been utilized such as braking flaps on the aircraft wings, parachutes and other air drag devices. In propeller operated aircraft it is possible to utilize the power output of the engine to obtain a braking effect on the aircraft by reversing the pitch of the propeller. This method of aircraft braking that utilizes the engine power to slow the aircraft and which maintains the power output of the engine for emergency acceleration when needed, has proved highly advantageous. The turbojet engine driven aircraft has no propeller by which the thrust can be reversed and, hence, it is desirable to provide some other means whereby the power of the engine can be utilized to provide a braking effect on the aircraft and whereby the engine power output can be maintained for emergency forward thrust. It is especially important in turbojet aircraft to maintain the power output and speed of the engine during landing approaches due to the fact that jet engines have a considerably longer delay in reaching full power from reduced power condition than do piston type internal combustion engines. In the event of an emergency where the pilot immediately needs full power for acceleration it is thus desirable to maintain a high speed and power output of the engine at all times.

The most practical method of using the engine power to provide a braking effect of a jet propelled aircraft is to provide a means for redirecting the thrust of the engine in a forward direction, and such devices have hitherto been proposed. It is important that the thrust reversing or redirecting means be of such a type that upon failure of auxiliary power used to operate the thrust reversing means the pilot will have forward thrust available.

To provide for temporary thrust increases for emergency and ultra high performance of turbojet aircraft, afterburners have been provided in the engines whereby the temperature of the exhaust gases can be considerably raised to effect a greater thrust without having unduly high temperatures present in the temperature vulnerable turbine section of the engine. These afterburners require a large amount of additional space at the rear of the engine that already is of considerable length to provide for proper fuel injection and burning in the afterburner.

Accordingly, it is a primary object of this invention to provide a turbojet engine with an improved thrust reversing device to give added safety in aircraft operation by reducing the distance required for landing, to eliminate the need for reducing engine speed during the landing approach and to improve the taxiing operation of the aircraft.

A further object is to provide a variable thrust reversing means for an aircraft jet engine that will aid in directional control during high speed and high altitude operation as well as being an additional mean of braking the flight speed of the aircraft.

It is still a further object to provide a thrust reversing means constructed so as to be fail safe, that is, if the controls should fail the thrust reverser will automatically be positioned to provide full forward thrust.

An additional object of this invention is to provide a novel afterburner means combined with a jet thrust reversing means wherein the space occupied by the thrust reverser and the afterburner is little or no more than that required by either if used alone.

These and other objects of the invention will be readily apparent in the following specification and drawings.

The present invention includes a jet thrust reversing means in the turbojet exhaust duct having blocking vanes for stopping the rearward flow of propulsive gases and variable area exhaust ports and redirecting vanes for diverting the flow of propulsive gases forwardly on the engine. Both the blocking vanes and the variable area redirecting ports are controlled simultaneously by a common actuator to their thrust reversing positions and are returned to their normal forward thrust position by the gas stream acting on the blocking vanes. The present invention also includes the combination of an afterburner with the thrust reversing means and the utilization of the blocking vanes as a fuel distribution and injection means.

FIGURE 1 of the drawings is a partial somewhat schematic view of a jet engine embodying thrust reversing and afterburner means according to this invention.

FIGURE 2 is a large sectional view of a portion of the thrust reversing means taken on the plane indicated by the line 2—2 in FIGURE 3.

FIGURE 5 is a view substantially taken on the line indicated by line 5—5 of FIGURE 3 with parts broken away and in section.

FIGURE 6 is an enlarged view of the portion of the broken away portion of FIGURE 3 taken on line 6—6 of FIGURE 5.

FIGURE 7 is an enlarged view showing details of the vane operating linkage.

FIGURE 8 is an elevational view of the structure shown in FIGURE 6 with certain parts broken away for clarity.

FIGURE 9 is a view showing details of the vane operating linkage.

FIGURE 10 is a view showing the operating linkage between the blocking vanes and the exhaust closure.

FIGURE 11 is a cross-sectional view taken on the line 11—11 of FIGURE 3.

FIGURE 12 is a view taken on the plane indicated by line 12—12 of FIGURE 3 showing the fuel injecting ports located in the blocker vanes.

Figure 3:
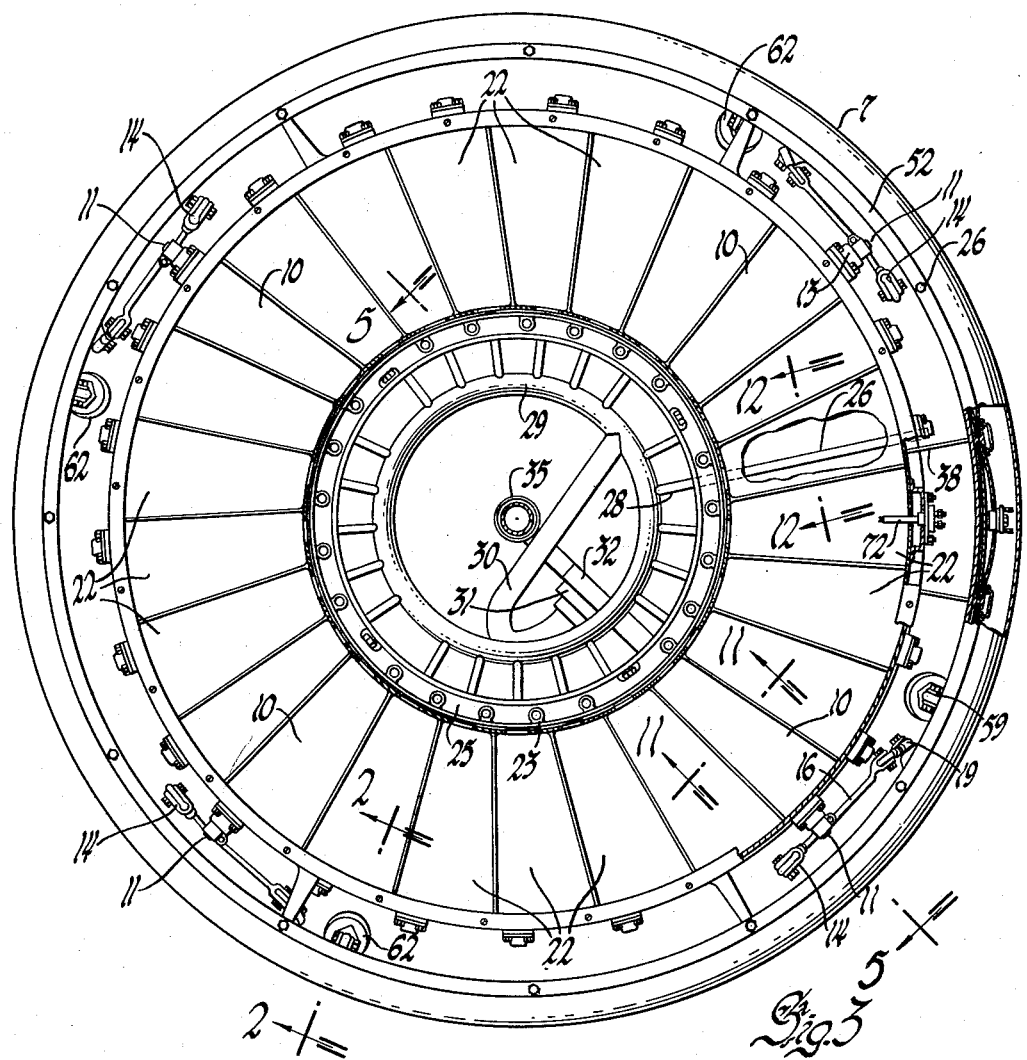
FIGURE 3 is a cross-sectional view of the engine just ahead of the thrust reverser and looking towards the rear of the engine.

Referring now to FIGURE 1 of the drawings, the turbojet engine includes a compressor 1 which receives air and discharges it under pressure through a diffuser 2 to an annular group of combustors 3 wherein fuel is supplied and the resulting mixture is ignited to further raise the pressure and temperatures of the gas. The high pressure, high temperature gases from the combustors 3 are directed into a turbine 4 which is internally connected to drive the compressor 1 and from which the exhaust gases flow into the combination exhaust duct, thrust reverser and afterburner generally designated by 5. Since the invention is directed to the thrust reverser and afterburner and since the remainder of the engine including the compressor, combustors and turbine may be of known type and design, the structural details of the thrust reverser and afterburner only are illustrated. The exhaust gases pass out the rear of the engine through an exhaust duct area 6 that is formed on the inside by a tail cone 8 and on the outside by an annular cowl or shroud 9 fastened to the engine proper. Surrounding the annular cowl 9 and radially spaced therefrom is an axially movable secondary cowl or shroud 7.

Blocking vanes

In the path of flow of the propulsive gases there are provided four circumferentially spaced master blocking vanes 10 each having a spindle portion 11. These spindle portions 11, as shown in FIGURES 3, 5 and 7, are pivoted on their inner ends in tail cone 8 by bearings 12 and on their outer ends to the stationary cowl 9 by bearings 13.

The master blocking vanes 10 normally are in unblocking position as shown by the dashed lines in FIGURE 5 and can be moved to blocking positions as shown in solid lines in FIGURE 5 and in FIGURE 3 by suitable linkage. This linkage, shown partially in FIGURE 5 and more completely in FIGURE 10, includes an actuating arm 14 fixed on the outer end of the vane spindle 11, the arm 14 being pivotally connected to an intermediate link 15 whose length can be adjusted, the link 15 in turn being pivotally connected by a pin 17 to an intermediate portion of a forked lever 16. The forked lever 16 is pivoted at one end to the stationary cowl 9 by a bolt 18 and at the other end is pivotally connected by a pin 20 to a further adjustable link 19 in turn pivotally connected by a pin 21 to the movable cowl 9. This linkage converts axial movement of cowl 7 to rotary movement of the master vanes 10. The solid line position of the linkage in FIGURE 10 shows the linkage in a position whereby the vanes are in their open position and the dotted lines indicate the position of the linkage when the vanes are in their closed position.

FIGURE 11 shows the master vane 10 in cross section. The point represented by 73 is the approximate center of pressure of the propulsive gas acting on the vanes. It will be clearly seen that the force of the propulsive gases acts to rotate the vanes about their pivoted spindles 11 in a clockwise or opening direction.

As shown in FIG. 3, spaced intermediate each of the four master blocking vanes 10 are a plurality of auxiliary or follower vanes 22. These follower vanes 22 are operated by movement of the master vanes 10 through a linkage mechanism about to be described. Fixed to the inner end of each of the master vanes 10 is a forked arm 23 as shown in FIGURES 5 and 7. These arms are connected by a ball and socket joint 24 to a follower ring 25. Each of the follower vanes 22 has a spindle portion 26 on whose inner end is fastened an arm 27 having a spherical end engaged in an aperture in the follower ring 25 as shown in FIGURE 9. The follower vane spindles 26 surround stationary tubes 28 which lead radially from an annular manifold 29 located near the axial center of the engine into the hollow spindles 26. Manifold 29 is connected by a curved supply tube 30 to a distribution fitting 31 fastened to and leading from a hollow strut 32. The hollow strut 32 is fastened on its outer end by plate 33 to the stationary cowl member 9 and externally of the cowl 9 the strut 32 connects to a fuel supply tube 34 which in turn leads from an afterburner fuel supply pumping and control system not shown.

FIG. 12 shows a cross-section of follower vanes and the center of pressure of the propulsive gases acting on the vanes is represented by 74. As in the case of the master vanes 10 the force of the gases will urge the vanes in a clockwise or opening direction.

The inner end of the hollow strut 32 supports a hollow tube 35 at the axial centerline of the engine. Three other struts, not shown, similar to strut 32 are circumferentially spaced around tube 35 and are fastened on their outer ends to the stationary cowl 9. These other struts are also hollow and act to provide an air supply to the tube 35 which leads into the turbine section of the engine. Air fed through these other struts and into the tube 35 acts to cool the turbine.

Circumferentially spaced around the stationary cowl 9 are two groups of rectangular exhaust ports or nozzles 36. Each group includes five adjacent ports and covers about 100 degrees of the engine circumference, the two groups together providing ports around about five-ninths of the engine. Located in each of these exhaust ports 36 are a series of gas flow directing vanes 37 as shown in FIGURES 5, 6 and 8. Strut walls 38 extending radially outward are provided circumferentially around the stationary cowl 9 and act to separate the exhaust ports 36. Auxiliary supports 39 shown in FIGURES 5 and 6 act to hold and brace the directing vanes 37.

Closure gates

Each of the exhaust ports 36 is normally closed by a sliding closure or gate assembly generally designated at 40. The closure assembly, three views of which are seen in FIGURES 5, 6 and 8, consists of an inner arcuate plate 41 and an outer slightly more arcuate plate 42 having circumferentially extending strengthening flanges 43, the outer plate 42 being welded at its ends to longitudinal flanges 44 formed on the edges of inner plate 41 as best seen in FIGURE 6. These end flanges 44 act as guide members and are received in H-shaped longitudinal guide members fixed to the outer end of struts 38. Each of the closure assemblies 40 is connected to its adjacent assembly by a connector 46 having feet or flanges 47 fixed in channels 48 fastened by any suitable means to the outer plate 42 adjacent its connection to guide flange 44.

Figure 4:
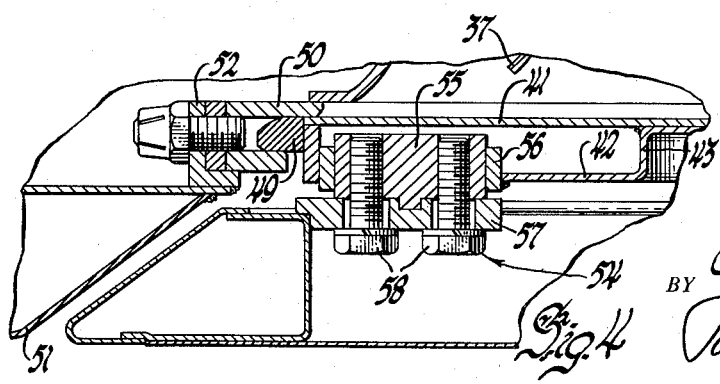
FIGURE 4 is an enlarged sectional view of a portion of the variable area control means.

As seen in FIGURES 4 and 5, when the slidable closure assemblies 40 are in position to close the exhaust ports 36, they bear against arcuate seal strips 49 carried in a channel 50 fastened to turbine shroud 51 by means of a circumferential ring 52. Turbine shroud 51 is fixed to the turbine core. The seal 49 acts as a face contact seal between the closure gates and the forward or left hand ends of the exhaust ports 36 as viewed in FIGURE 5.

A second seal member 53 carried by the rearmost directing vane 37' continuously engages the inner face of the plate 41 as it is axially moved to open the exhaust ports 36. Apertures 70 and 71 formed in the vane 37' allow gas pressure within the exhaust nozzle 5 to act on the inner end of the seal 53 to hold it in tight sealing engagement with the plate 41 of the closure assembly 40.

Each of the closure assemblies 40 is connected to the outer movable cowl 7 by a tying means generally designated at 54. This tying means as shown in FIGURE 4 includes a flange nut 55 mounted through a bushing 56 carried by the gate assembly 40. A plate 57 is secured by bolts 58 threaded into the flange nut 55 to the movable outer cowl 7. Thus, it will be seen as the cowl 7 is axially moved it will carry with it the closure gate assemblies 40.

As shown in FIGURES 2 and 3, the outer movable cowl 7 has four circumferentially spaced brackets 59 connected to actuator rods 60 by means of pins 61, the rods 60 each being connected to a piston in a hydraulic cylinder 62. The rearmost ends of the cylinders 62 are connected by brackets 63 to the inner stationary cowl 9. The cylinders 62 are actuated by hydraulic pressure to move the rods 60 and the outer cowl 7 connected thereto to the left as viewed in FIGURES 2 and 5 and thereby slide the closure gate assembly 40 in guide 45 also to the left to close the exhaust ports 36. By suitable controls the cylinders 62 can be made to position the outer cowl 7 and closure gates 40 in any intermediate position between fully closed and fully opened and thereby regulate the quantity of propulsive gases passing out through the exhaust ports 36.

Afterburner

Spaced in the exhaust nozzle between the tail cone 8 and the stationary cowl 9 is an intermediate shroud 64 supported by the strut 32 and the other similar struts not shown. As shown in FIGURE 5, both the tail cone 8 and the intermediate shroud 64 have step portions facing the rear of the engine. The step portion 65 of the tail cone and step portion 66 of the intermediate shroud 64 act as flame holders or gutters during afterburner operation. These step portions 65 and 66 provide for controlled turbulence of the burning mixture and prevent the afterburner flame from being blown out the rear end of the engine. In order to supply fuel for afterburner operation there is provided a novel fuel distribution means which includes the use of the jet thrust reversing blocking vanes to supply fuel in the exhaust nozzle. In FIGURE 12 the follower vane spindles or tubes 26 are provided with fuel injection holes or ports 67 facing the leading edge of the vanes and the vanes are dimpled at the hole locations. Thus when the vanes 22 are in their open or non-blocking position and fuel is supplied through tube 34, strut 32, pipe 30, ring 29, and distribution tubes 28 into hollow spindles 26, the fuel will be sprayed through holes 67 forwardly into the gas stream.

At the forward portion of the afterburner and exhaust assembly and just to the rear of the turbine assembly there are provided one or more conventional hot streak igniters 68 which shoot a column of ignited fuel towards the rear of the afterburner and act to ignite the mixture of propulsive gases leaving the turbine assembly 4 and the fuel injected through the spray tubes 26. Other means of igniting the afterburner may be used, the hot streak igniter being only illustrative. The flame holders 65 and 66 act to maintain ignition in the afterburner in known manner.

In the outer sliding cowl 7 there are provided a plurality of access doors 69 as shown in FIGURE 6 which enable the securing or tying means 54 to be assembled or disassembled. Thermocouples 72 are provided at the afterburner assembly entrance for regulation of the engine fuel supply.

Operation

The thrust reverser used for aircraft braking and the afterburner used for acceleration are of course operated at different times. When the aircraft operator desires to obtain a braking effect he does so by controlling the actuators 62 which can be operated to variably open the exhaust nozzles 36 by means of rods 60, brackets 59, outer cowl member 7, tying assembly 54 and sliding gate assemblies 40. Simultaneously the outer sliding cowl 7 rotates the master blocker vanes 10 by means of the pin 21 and linkage 14, 15, 16, 19 and spindles 11. Movement of the follower vanes 10 in turn rotates levers 23 fixed on their inner ends which in turn rotate follower ring 25 and through levers 27 rotate the follower vanes 22.

Either by the aircraft operator's release of pressure within the hydraulic cylinder 62 to move the outer cowl 7 towards the rear of the engine or by failure of controls for the actuator 62 the pressure of propulsive gases acts to rotate the follower vanes into their non-blocking position. Movement of the follower vanes causes the master vanes 10 to return towards their open position because of the lever 27, ring 25 and levers 23 rotating the master vanes 10. This rotation of the master vanes toward their open position causes the linkage 14, 15, 16 and 19 to slide the outer cowl 7 which carries the closure gate 40 forward and thus close off the exhaust ports 36. Thus loss of hydraulic power in the control system will cause the blocker vanes to open and the reversing ports 36 to be closed affording full forward thrust. This is an important safety feature and is an important part of the invention. By variably positioning the blocker vanes and by simultaneously controlling the area of the redirecting exhaust ports 36 the operator can proportion the exact amount of rearward thrust and forward thrust he desires.

When the operator desires afterburner operation he operates the fuel controls to supply fuel under pressure to pipe 34 which supplies fuel to the hollow strut 32 which in turn leads to the conduits 30 then to the distribution ring 29. Through the radially extending tubes 28 fuel then is supplied from the distribution ring 29 into the hollow spindles of the follower vanes and through the spray port 67 the fuel is injected into the gas stream. Simultaneously, the operator actuates the hot streak igniters 68 which act to ignite the afterburner fuel to provide for increased jet thrust to raise the temperature of the propulsive jet and thus increase the thrust in a known manner.

The rear of the turbine nozzle may be controlled by variable means of known type to change the exhaust area.

It will be apparent to those skilled in the art that many modifications of the system and components thereof may be made within the scope of the invention which is not to be considered as limited by the detailed description of the preferred embodiment described and shown.

I claim:

1. In a turbojet engine having an exhaust duct for rearwardly discharging gases to provide forward propulsion, said exhaust duct being formed by an inner annular wall and an outer annular wall, a plurality of radially extending vanes extending between said walls and mounted for pivotal movement about circumferentially spaced radially extending axes in the duct and pivotable on said axes between an unblocking position to a position to block the rearward discharge of the gases, a plurality of openings in said outer wall forward of said vanes, closure means carried by said exhaust duct and axially movable on the outside of said outer wall to cover and uncover said openings, means in said openings to deflect said gases in a forward direction, means for axially moving said closure means, said vanes each having a pivot shaft having an inner end extending through said inner wall and an outer end extending through said outer wall, first mechanical linkage means operatively connecting said closure means to the outer end of the pivot shaft of at least one of said vanes for causing pivotal movement thereof concurrently with axial movement of said closure, and ring means carried inside of said inner wall, second linkage means operatively connecting the inner end of the pivot shaft of said one vane to said ring means for causing circumferential rotation of the same about the axis of said duct, and additional linkage means operatively connecting said ring means to the inner ends of the pivot shafts of said other vanes for causing pivotal movement of said other vanes in unison with said one vane.

2. In a turbojet engine having an exhaust duct for rearwardly discharging gases to provide forward propulsion, means for reversing the direction of the discharging gases including a plurality of radially extending vanes mounted for pivotal movement about circumferentially spaced radially extending axes in the duct pivotable on their axes between positions where the gases are allowed to rearwardly discharge to positions where the rearward discharge is blocked, said duct having a wall, a plurality of openings in said wall forward of said vanes, means in said openings for changing the direction of flow of said gases, a cowl surrounding and slidably mounted on said duct wall, closure means carried by said cowl for covering and uncovering said wall openings, mechanical linkage between said cowl and said pivoted vanes for converting the sliding movement of the cowl to rotating movement of the vanes, actuating means carried by said duct for sliding said cowl and thereby uncovering said wall openings and rotating said vanes to their blocking position, said vanes being constantly urged by the propulsive gases to their unblocking position, whereby when the actuating means is inoperative to move the cowl to move the closure means to uncovering position the vanes will move to their unblocking position and simultaneously through said linkage move the cowl to a position wherein the closure means covers the wall openings.

References Cited in the file of this patent

UNITED STATES PATENTS

| | | |
|---|---|---|
| 2,508,420 | Redding | May 23, 1950 |
| 2,672,011 | Von Zborowski | Mar. 16, 1954 |
| 2,681,548 | Kappus | June 22, 1954 |
| 2,693,083 | Abbott | Nov. 2, 1954 |
| 2,776,734 | Hackett | Jan. 8, 1957 |
| 2,780,058 | Beale et al. | Feb. 5, 1957 |
| 2,794,317 | Brown | June 4, 1957 |
| 2,940,252 | Reinhart | June 14, 1960 |
| 2,944,395 | Doak | July 12, 1960 |

FOREIGN PATENTS

| | | |
|---|---|---|
| 510,584 | Canada | Mar. 1, 1955 |
| 995,748 | France | Aug. 22, 1951 |
| 56,672 | France | July 23, 1952 |
| | (1st addition to No. 943,820) | |
| 1,092,654 | France | Nov. 10, 1954 |